United States Patent [19]

Saur et al.

[11] 4,425,069
[45] Jan. 10, 1984

[54] TRANSPORT FOR LOADING SEMITRAILERS AND THE LIKE

[75] Inventors: Charles Saur, Sparta; Samuel J. DeMan, Grand Rapids, both of Mich.

[73] Assignee: Lear Siegler, Inc., Grand Rapids, Mich.

[21] Appl. No.: 273,117

[22] Filed: Jun. 12, 1981

[51] Int. Cl.³ .................. B65G 67/08; B61K 7/00; B65G 41/02

[52] U.S. Cl. .................. 414/398; 104/249; 198/311; 414/347

[58] Field of Search .......... 104/245, 247, 249, 250, 104/260; 198/303, 304, 306, 311, 314, 587; 414/373, 390, 398, 572, 909, 347

[56] References Cited

U.S. PATENT DOCUMENTS

| | | | |
|---|---|---|---|
| 846,339 | 3/1907 | McRaven | 104/247 |
| 1,550,250 | 8/1925 | Hackett | 198/304 X |
| 1,595,565 | 8/1926 | Newdick | 414/572 |
| 1,625,936 | 4/1927 | Ferry et al. | 188/5 |
| 1,643,959 | 10/1927 | Sebell | 188/5 |
| 2,062,931 | 12/1936 | Raffa | 188/5 |
| 2,347,522 | 4/1944 | Stinnett | 198/311 X |
| 2,634,870 | 4/1953 | Barnum | 414/398 |
| 2,670,836 | 3/1954 | Ball | 198/314 |
| 2,776,033 | 1/1957 | Presti | 198/300 |
| 3,006,454 | 10/1961 | Penn | 198/302 |
| 3,294,214 | 12/1966 | Tweten | 198/592 |
| 3,341,039 | 9/1967 | Cranage | 198/304 X |
| 3,471,893 | 10/1969 | Morine | 198/300 |
| 3,593,667 | 7/1971 | Morris | 104/247 X |
| 3,836,021 | 9/1974 | McWilliams | 414/398 |
| 3,934,683 | 1/1976 | Walker | 414/234 |
| 4,281,955 | 8/1981 | McWilliams | 198/303 |

Primary Examiner—Randolph Reese
Assistant Examiner—David F. Hubbuch
Attorney, Agent, or Firm—Price, Heneveld, Huizenga & Cooper

[57] ABSTRACT

A transport for loading semitrailers and other similar cargo carrying vehicles includes a portable conveyor shaped to extend into a trailer, and load the same from front to rear. The portable conveyor is preferably self-propelled, and has steerable front wheels at the downstream end of the conveyor, with a steering arm to manually pilot the conveyor into the trailer, and around the loading dock area. A guidance mechanism positions the portable conveyor in a selected storage position in the loading area, and comprises a pair of guides which depend from the upstream end of the conveyor, and matingly receive a floor mounted guide rail therebetween. Ramp blocks are located at the base end of the guide rail to positively and safely stop the conveyor in the storage position.

31 Claims, 13 Drawing Figures

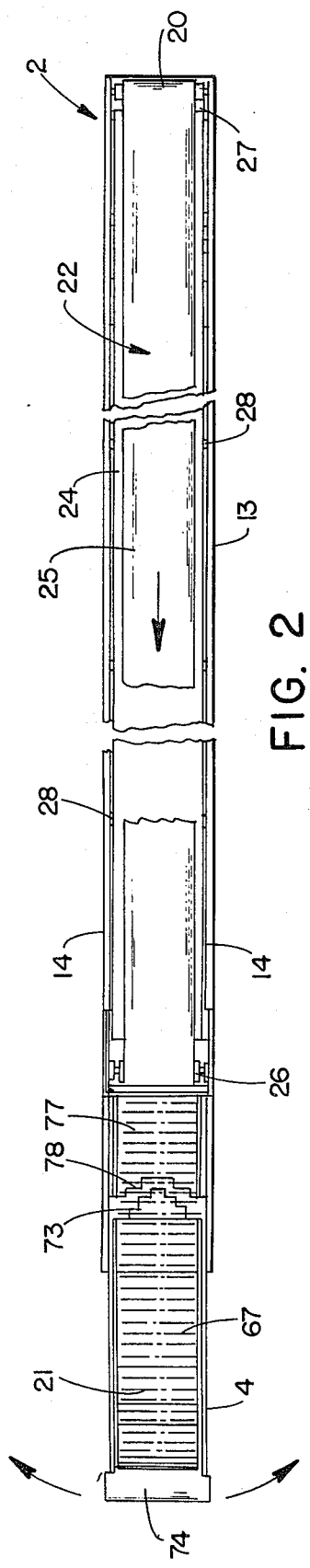
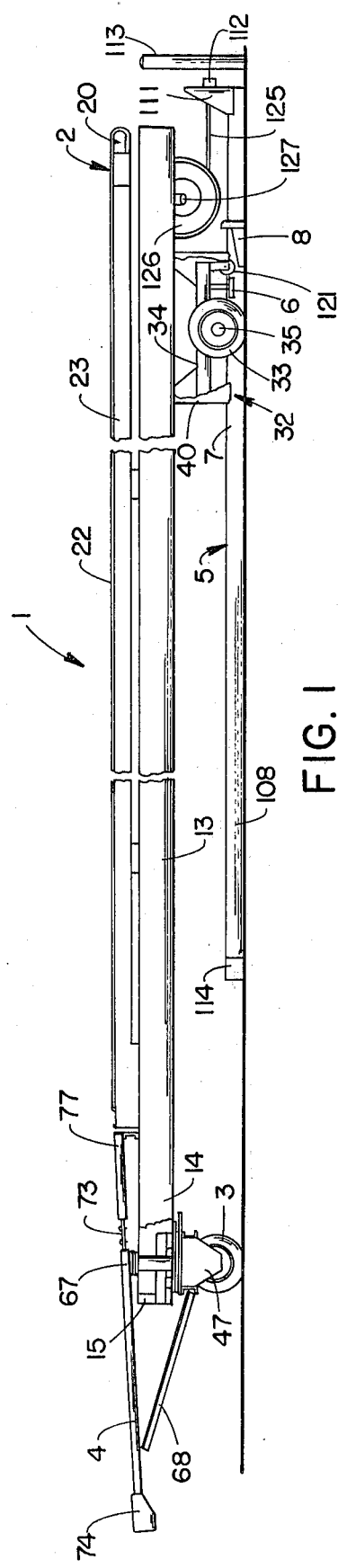

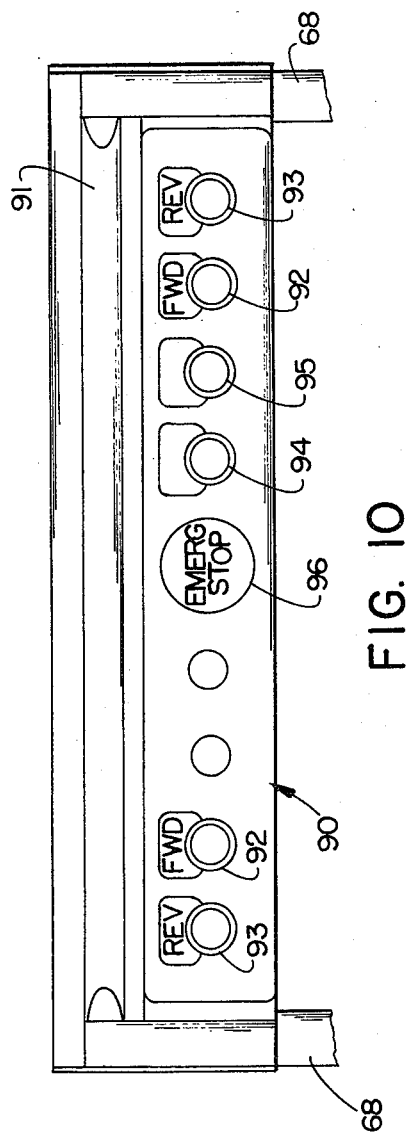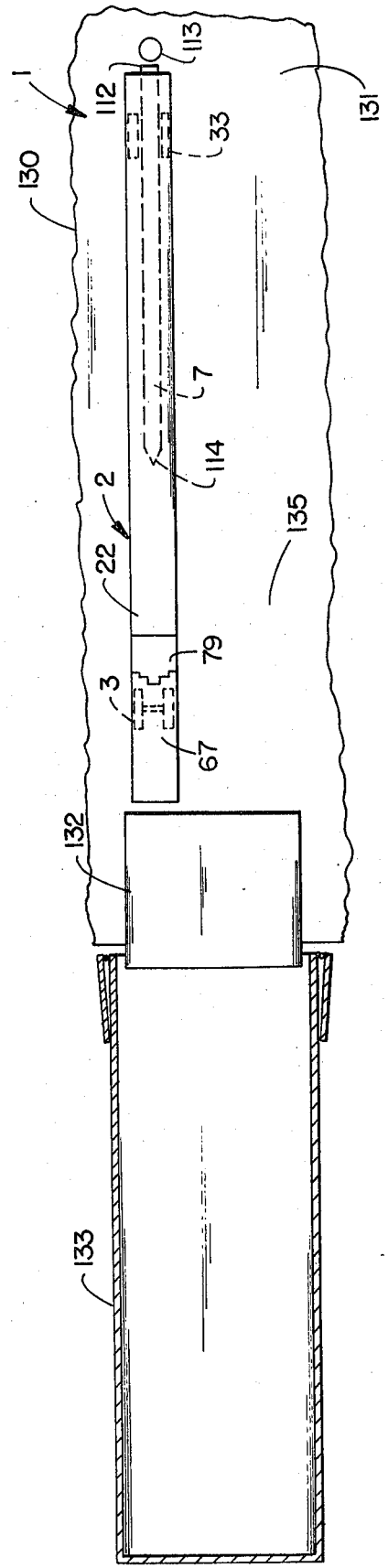

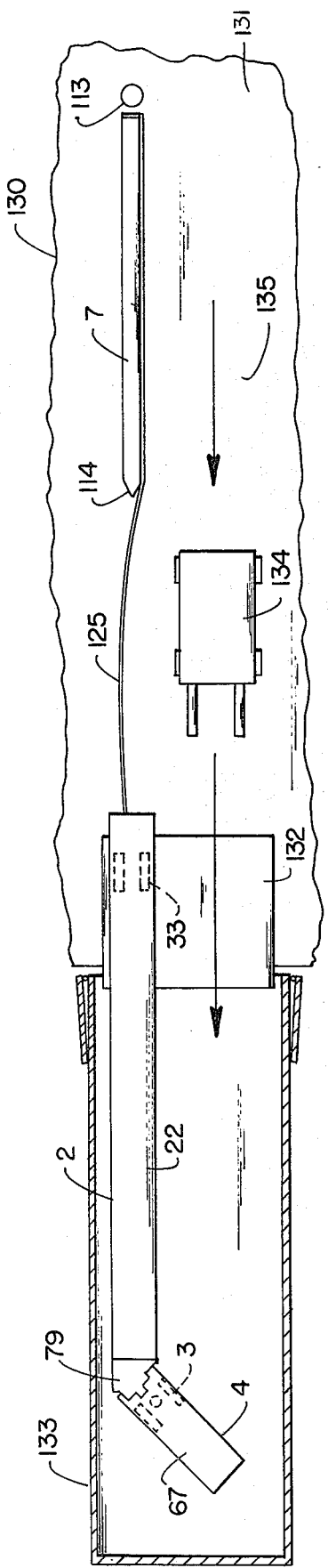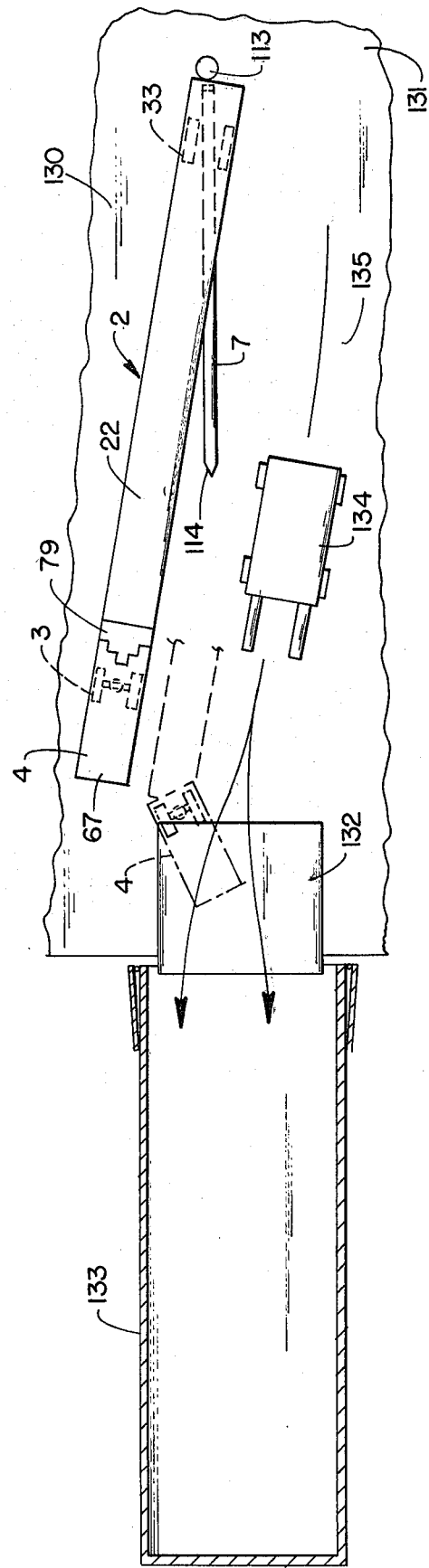
FIG. 12
FIG. 13

TRANSPORT FOR LOADING SEMITRAILERS AND THE LIKE

BACKGROUND OF THE INVENTION

The present invention relates to conveyors, and in particular to a transport arrangement for loading semitrailers and the like from a dock area.

Large semitrailers and other similar cargo carrying vehicles are typically loaded from an elevated dock area of a warehouse or factory. In the grocery industry, the vehicles are capable of transporting more than one order at a time, so that the goods for each order must be loaded sequentially into the trailer in accordance with the selected delivery route. Overhead warehouse conveyors are generally used to transport the unpalletized articles of each order from a warehouse area to a loading area of the facility. The articles are manually lifted off of the conveyor and stacked onto pallets to facilitate unloading. Large, bulky items, such as paper goods and the like, are already palletized by the manufacturer, or are batch picked, and are loaded directly into the trailer by a hand truck or fork lift vehicle.

Telescoping conveyors, such as that illustrated in U.S. Pat. No. 3,294,214, have been used to transport articles from a loading dock into a trailer or truck bed. However, such conveyors have either a rather complicated, two-part conveyor belt arrangement, and/or must be cantilevered into the trailer from the loading area. This type of construction is generally considered inherently unstable, and is particularly unwieldly for loading long semitrailers.

The bays in loading docks are rather narrow, and spaced closely together in a side-by-side fashion, such that it is important to provide trailer loading conveyors with a mechanism which not only aligns the conveyor with the trailer, but can also guide the conveyor into a preselected storage position. Heretofore, the telescoping, cantilevered type of extendable conveyors have included channels or tracks in the floor of the loading dock which extend to the dock plate to guide the conveyor between the extended and retracted positions. However, the tracks and mating caster wheels are subject to abuse and deterioration from vehicular traffic, such as fork lift trucks, hand trucks, dropped loads, foreign materials, and the like. The conveyors themselves are also subject to damage from collisions with fork lift trucks and other traffic. Hence, such conveyors can quickly become difficult to operate, and require frequent repair.

Another drawback associated with the telescoping type of conveyor is that it cannot be steered or moved laterally in the loading bay. As a result, such conveyors must be positioned along the longitudinal centerline of the bay to insure that the conveyor is properly aligned with the semitrailer to be loaded, and can be fully extended. Because of this on-center positioning, when the conveyor is extended into the semitrailer, fork lift trucks, or other cargo vehicles cannot simultaneously access the trailer to load it, but must wait until the conveyor has been fully retracted into the storage position. Also, the take-off end of the conveyor cannot be moved laterally from one side of the trailer to the other to facilitate unloading.

Finally, the cantilevered type of loading conveyor generally does not include any mechanism to adjust the height of the discharge end. Since the height of semitrailers and truck beds varies, the elevation of the discharge end of the conveyor cannot be maintained at a convenient height for unloading.

SUMMARY OF THE INVENTION

One aspect of the present invention is a transport for loading semitrailers and the like, comprising a portable conveyor having a guidance mechanism for positioning the conveyor at a selected storage location in the loading area. The guidance mechanism comprises a pair of guides connected with the upstream end of the conveyor, which depend therefrom to a position adjacent the floor surface. A guide rail is attached to the loading area floor surface at a position corresponding to the selected conveyor storage location. The guide rail extends upwardly from the floor, and has a width which is matingly received between the guides for positively guiding the conveyor into the selected storage position. Preferably, the conveyor is self-propelled, and includes steerable wheels at its downstream end, with controls for the conveyor drive motor at the free end of a manual steering arm. The portable conveyor is driven directly into the semitrailer during loading, and the elevation of the exit end remains at a convenient height for unloading. Also, it is preferred that the length of the guide rail is shorter than the conveyor so that the conveyor can be bodily detached from the rail for ready transport to a variety of operational positions.

Another aspect of the present invention is a portable conveyor, comprising an elongate frame having means for conveying articles from an upstream end to a downstream end of the conveyor. Means are provided for movably supporting the conveyor frame on a floor surface, and includes at least one steerable wheel pivotally mounted at the downstream end of the conveyor for rotation in a generally horizontal plane, with a steering arm connected with and projecting from the steerable wheel for manually piloting the conveyor.

Yet another aspect of the present invention is a conveyor system having a self-propelled conveyor, and a pair of ramp blocks which positively and safely stop the conveyor in a selected storage position in the loading area.

The principal objects of the present invention are to provide a transport arrangement for loading semitrailers with grocery articles, and other similar applications, which is quite uncomplicated, durable, and easy to load the vehicle in a front to rear sequence. The transport arrangement includes a self-propelled conveyor which can be steered from the downstream end thereof, so as to quickly and accurately position the conveyor within a trailer. A guidance mechanism positively locates the conveyor along one side of the bay, so as to form an aisle alongside the conveyor in which lift trucks and the like can be driven to simultaneously load the trailer with palletized and unpalletized articles. The conveyor can be steered into a position such that the downstream end is off of the loading ramp to fully access both sides of the semitrailer. A pivoting take-off and accumulator section of the conveyor greatly reduces unloading effort and time. The conveyor is safe and uncomplicated in operation, efficient in use, economical to manufacture, capable of a long operating life, and particularly well adapted for the proposed use.

These and other features, advantages and objects of the present invention will be further understood and appreciated by those skilled in the art by reference to the following written specification, claims, and appended drawings.

BRIEF DESCRIPTION OF THE DRAWINGS

FIG. 1 is a fragmentary, side elevational view of a transport system and portable conveyor embodying the present invention.

FIG. 2 is a fragmentary, top plan view of the conveyor.

FIG. 10 is a front elevational view of a motor control panel for the conveyor.

FIG. 11 is a schematic, top plan view of the conveyor shown in a storage position.

FIG. 12 is a schematic, top plan view of the conveyor, shown in a loading position in one side of a semitrailer, with sufficient room on the other side to permit a fork lift truck to drive thereby.

FIG. 13 is a schematic, top plan view of the conveyor, shown with the downstream end positioned off of the loading ramp to one side of the bay for truck loading palletized articles into both sides of the semitrailer.

DETAILED DESCRIPTION OF THE PREFERRED EMBODIMENTS

Figure 3:
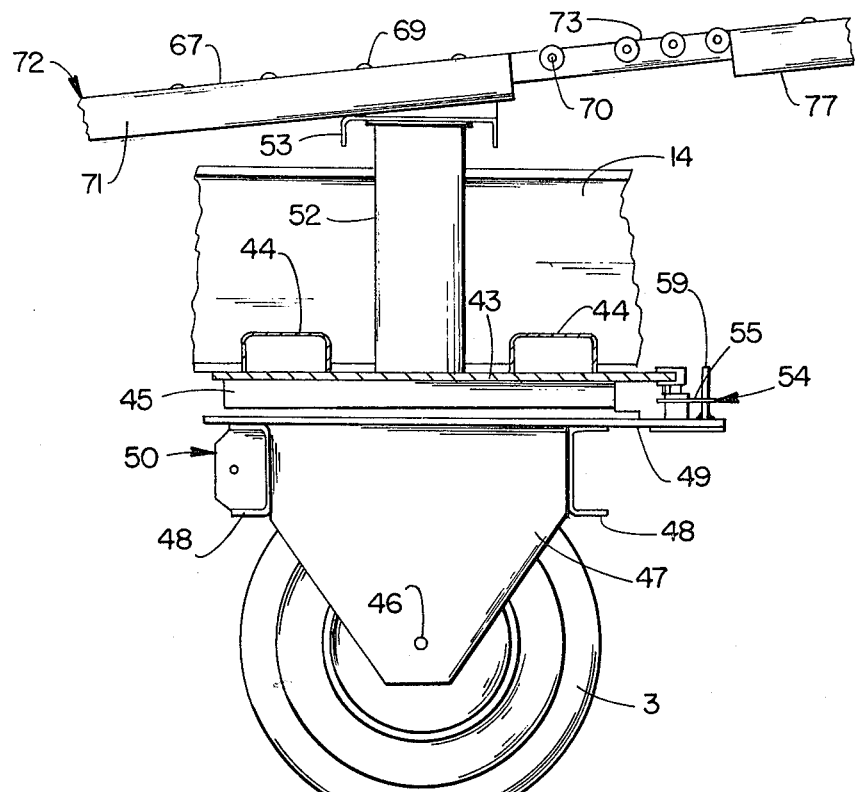
FIG. 3 is a fragmentary, side elevational view of steerable front wheels for the conveyor, with portions thereof broken away.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations, except where expressly specified to the contrary.

The reference numeral 1 (FIG. 1) generally designates a transport for loading unpalletized articles into a semitrailer, truck bed or similar cargo carrying vehicle, comprising a portable conveyor 2 shaped to extend into the trailer and load the same from front to rear. Conveyor 2 is preferably self-propelled, and has pivotally mounted, steerable wheels 3 at the downstream end of the conveyor, with a steering arm 4 attached thereto for manually piloting the conveyor into the trailer and around the floor of the loading dock. A guidance mechanism 5 helps position portable conveyor 2 in a selected storage position in the loading area, and includes a pair of guides 6, which depend from the upstream end of conveyor 2 and matingly receive a floor mounted guide rail 7 therebetween. Preferably, a pair of ramp blocks 8 are mounted at the rearward or base end of guide rail 7, and engage the conveyor to safely and positively stop the same in the selected storage position.

With reference to FIGS. 1 and 2, portable conveyor 2 has an overall length which is slightly greater than the longest semitrailer to be loaded. In this example, conveyor 2 has a length in the nature of 45 feet, and includes a main frame 13 comprising a pair of rectangular tubing side rails 14, with a plurality of laterally extending cross braces 28 interconnecting the same. Main frame 13 has a length in the range of 33-34 feet.

Main frame 13 supports a two-part conveying means which delivers articles from an upstream end 20 of conveyor 2 to a downstream end 21. The major portion of conveyor 2 comprises a belt-type conveyor 22 disposed at the upstream end of the conveyor, and has a generally conventional construction, comprising a bed or frame 23, upper support plate 24, a flexible belt conveyor 25, a driven end roller 26 and an idler roller 27. Belt conveyor 22 is sized to receive unpalletized articles from means such as an overhead warehouse conveyor (not shown), and transport them into a semitrailer. Belt conveyor 22 is bodily supported on main frame 13 by a plurality of cross braces 28, and in this example, has a width in the nature of two feet, which is narrower than main frame 13, so that the sides of the conveyor are protected by frame rails 14, and have no projections which might be hit and damaged during use.

Figure 8:
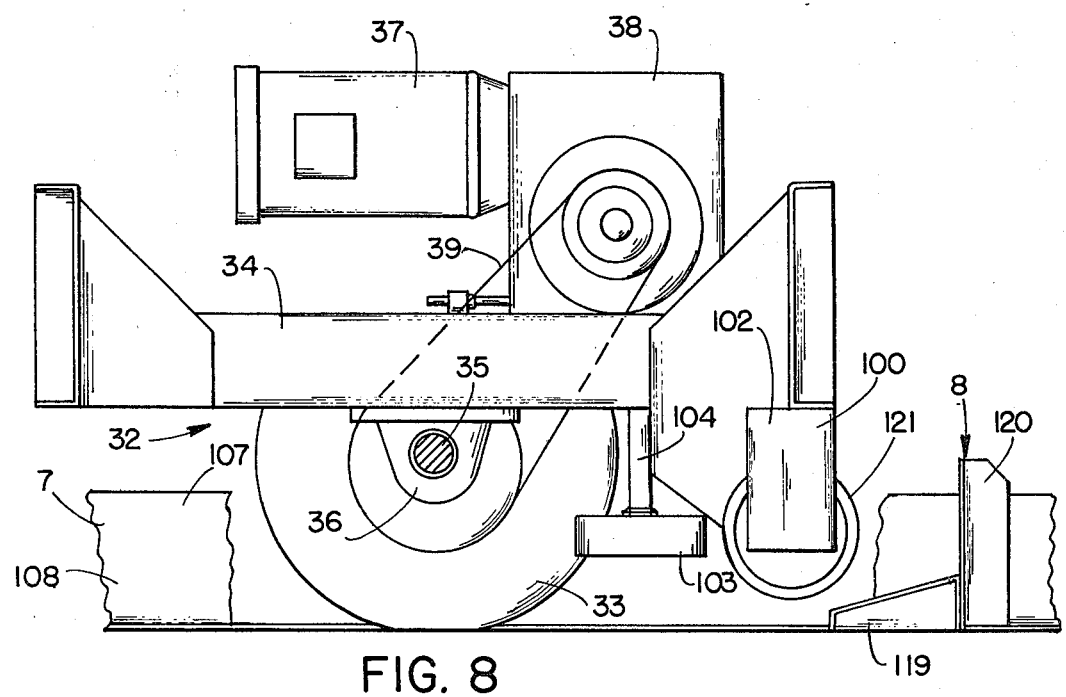
FIG. 8 is a fragmentary, side elevational view of the conveyor, particularly showing rear drive wheels therefor.

The rearward or upstream end 20 of portable conveyor 2 is supported by a wheeled drive assembly 32, comprising a pair of drive wheels 33 rotatably mounted on a frame weldment 34 by an axle 35 and mating pillow blocks 36 (FIG. 8). Wheels 33 are driven by a conventional source of power, such as the illustrated electric motor 37 and speed reducer 38, connected with drive wheels 33 by a chain and sprocket transmission 39. Speed reducer 38 has a sufficiently high gear ratio that it acts as a brake when the conveyor is at rest. This is particularly beneficial when the conveyor is disposed in an inclined orientation, such as where the trailer floor is lower or higher than the floor of the loading dock. As shown in FIG. 1, a plate shaped member 40 is attached to main frame 13, and covers the aisle side of drive assembly 32 to protect the same against damage due to collision with fork trucks, and other objects. Preferably, an audible alarm automatically sounds when drive wheels 33 are rotated so as to advise and warn personnel of conveyor movement.

Figure 4:
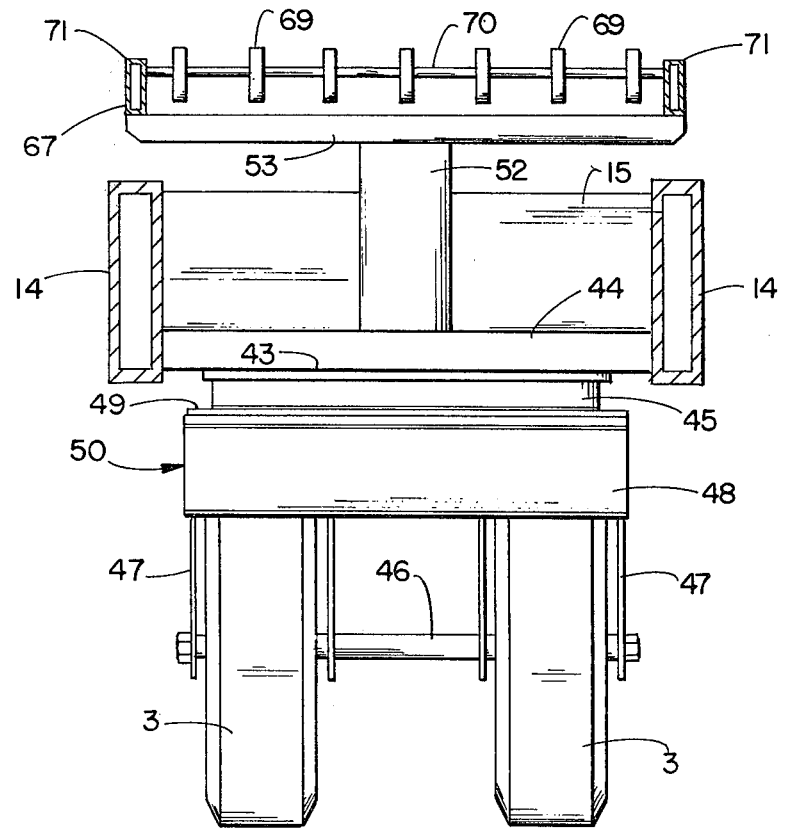
FIG. 4 is an end elevational view of the steerable front wheels.

The downstream end of portable conveyor 2 is supported on steerable wheels 3, which are pivotally mounted on main frame 13 with their rotational axes oriented generally horizontally, and are rotated to pilot conveyor 2 over the floor of the loading dock area. With reference to FIGS. 3 and 4, a pair of steerable wheels 3 are mounted in a closely spaced, laterally aligned relationship on an axle 46. Axle 46 is retained in place by a pair of clevice brackets 47 rigidly interconnected by cross braces 48. A plate 49 is anchored to the upper surface of clevice brackets 47 and cross braces 48, and defines a front wheel assembly 50 which is pivotally attached to main frame 13 by a thrust bearing 45. A tube 52 extends upwardly from plate 49. Thrust bearing 45 is supported on a plate 43, anchored to frame side rails 14 by cross braces 44. An inverted U-shaped channel 53 is fixedly attached to the upper end of tube 52, and rotates therewith for purposes to be described in greater detail hereinafter. Wheels 3 are preferably solid, and spaced closely together to increase conveyor stability, and particularly to reduce sudden lateral shifting of the conveyor downstream end upon impact with foreign objects on the floor. The illustrated wheels 3 are constructed of solid rubber with a rolling radius of 7¾ inches, and are spaced apart 8 inches center-to-center. The solid wheel construction also avoids puncture damage from staples, nails, bands, and other sharp fasteners which are commonly found on the floor of loading docks.

Figure 5:
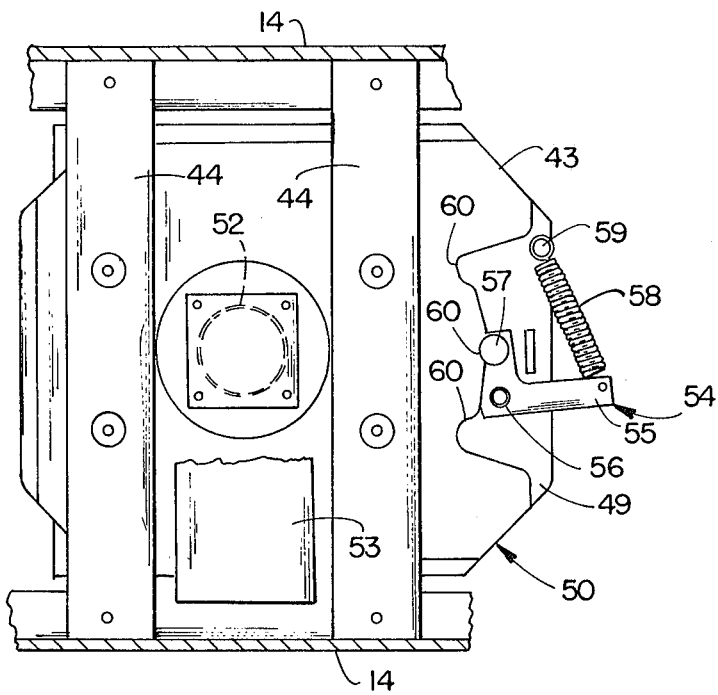
FIG. 5 is a top plan view of a pivotal mounting arrangement for the steerable front wheels.

As best illustrated in FIG. 5, steering plate 49 includes an indexing mechanism 54 which selectively retains steering wheels 3 in either a straight or a selected angular orientation. In this example, indexing mechanism 54 includes an L-shaped arm 55 rotatably attached to plate 49 by a pin 56, and having a cylindrical stop 57 attached to the short leg of arm 55. A coil spring 58 is connected between the longer leg of arm 55 and an anchor 59 fastened to plate 49, such that the resilient force of spring 58 urges stop 57 inwardly into one of three mating notches 60 disposed in upper plate 43. When stop 57 is located in the center notch 60, steering wheels 3 are aligned parallel with drive wheels 33, as well as the longitudinal axis of the portable conveyor. To steer portable conveyor 2, the operator applies a side force to steering arm 4, or other equivalent torque, thereby overcoming the resilient force of spring 58, and rotating plate 49 with respect to plate 43 as desired, but limited by a preselected angular distance when stop 57 engages one of the end notches 60. The end notches 60 prevent the steering wheels 3 from being rotated any further to an unstable condition, and also releasably retain wheels 3 in the maximum angular orientation.

A gravity feed conveyor section 67 (FIG. 1) has one end pivotally attached to the downstream end 21 of portable conveyor 2, and extends forwardly thereof to facilitate unloading the conveyor. A pair of angle braces 68 are connected with front wheel assembly 50, and support the free end of gravity conveyor section 67 in a downwardly inclined orientation. In the illustrated example, gravity feed conveyor section 67 (FIGS. 3 and 4) is fixedly attached to the inverted U-shaped channel 53 on front wheel assembly 50, and pivots therewith. Hence, gravity feed conveyor section 67 acts as a steering arm for wheels 3 by manually rotating the same along a generally horizontal plane, and also pivotally mounts conveyor section 67 on main frame 13. This results in angling the gravity feed portion 67 of the conveyor with respect to belt conveyor 22 to ease unloading. Pivoting gravity feed section 67 has a conventional construction, with a plurality of spaced apart roller wheels 69 mounted on axles 70 between side rails 71 of frame 72. The upstream end 73 of pivotal gravity feed section 67 has the rollers arranged in an inwardly stepped configuration, which angles inwardly toward the longitudinal centerline of the conveyor, and facilitates changing the direction of travel of the articles as they move down the conveyor. Furthermore, the outer end of conveyor section 67 includes a stop plate 74 (FIG. 9), which engages the articles as they translate to the end of the conveyor and frictionally stops their forwardly motion, so that conveyor section 67 acts as an accumulator. Preferably, stop plate 74 is adjustably attached to conveyor section 67 by means such as a bolt and slot arrangement 75 to vary its horizontal orientation, and thereby increase or decrease the frictional resistance offered by the stop plate to halt movement of the articles. A glueing mechanism (not shown) may be mounted just upstream of stop plate 74 for applying thin strips of adhesive to the bottom of the article packages to insure stable loading of the same.

Portable conveyor 2 is preferably manipulated from the free end of steering arm 4. As best illustrated in FIG. 10, a controller 90 is mounted at the end of pivotal gravity feed section 67, and includes switches for operating drive assembly 32 and belt conveyor 22. Controller 90 includes a horizontally extending handle 91 which is adapted for grasping to manually pivot conveyor section 67 and front wheels 3. A plurality of switches are mounted on controller 90, and include two pairs of drive wheel switches 92 and 93, with one switch of each pair disposed on opposite sides of the controller. Switches 92 and 93 are located just below handle 91, so that they can be depressed by the left and right hands of the operator while still maintaining his grip on the handle. This permits the operator to move the conveyor either in a forward or rearward direction, and control the direction of movement by steering wheels 3. Switches 92 and 93 respectively, control the forward and rearward motion of the conveyor through drive assembly 32, and are wired so that both switches in each pair must be depressed before the circuit is closed and the conveyor will move. Switches 94 and 95 control the drive motor for belt conveyor 22, and an emergency stop switch 96 turns off all power functions.

With reference to FIGS. 1 and 2, conveyor 2 includes a stationary gravity feed section 77, which is fixedly mounted on main frame 13 just downstream of belt conveyor 22. The stationary gravity feed section 77 has its rollers arranged in an outwardly stepped pattern at the downstream end 78 to mate with movable gravity feed section end 72, so that section 67 can be pivoted in a generally horizontal plane with respect to stationary section 77. Stationary conveyor section 77 forms a transition area between belt conveyor 22 and pivoting gravity feed section 67, and also acts as a part of the accumulator area of the conveyor.

Figure 6:
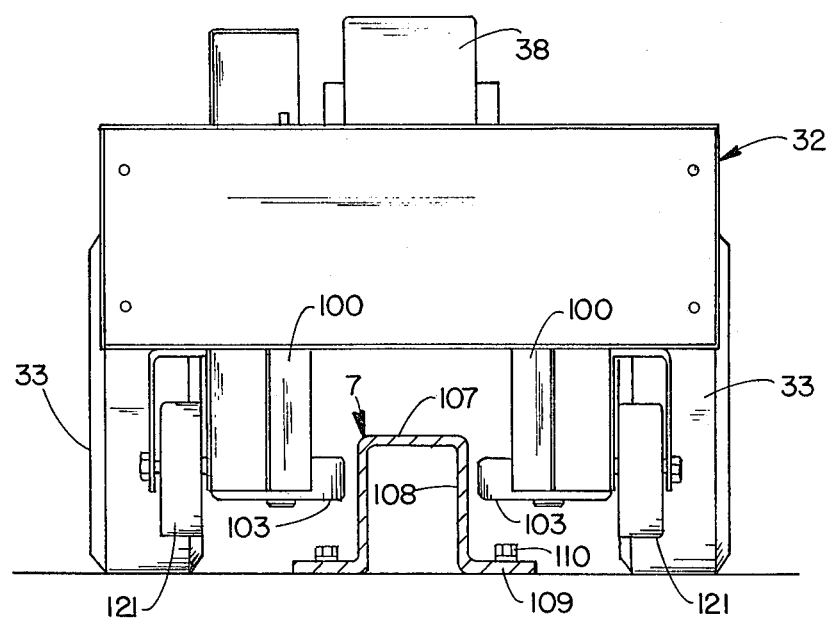
FIG. 6 is a fragmentary, end elevational view of the conveyor, particularly showing a guidance arrangement therefor.
Figure 7:
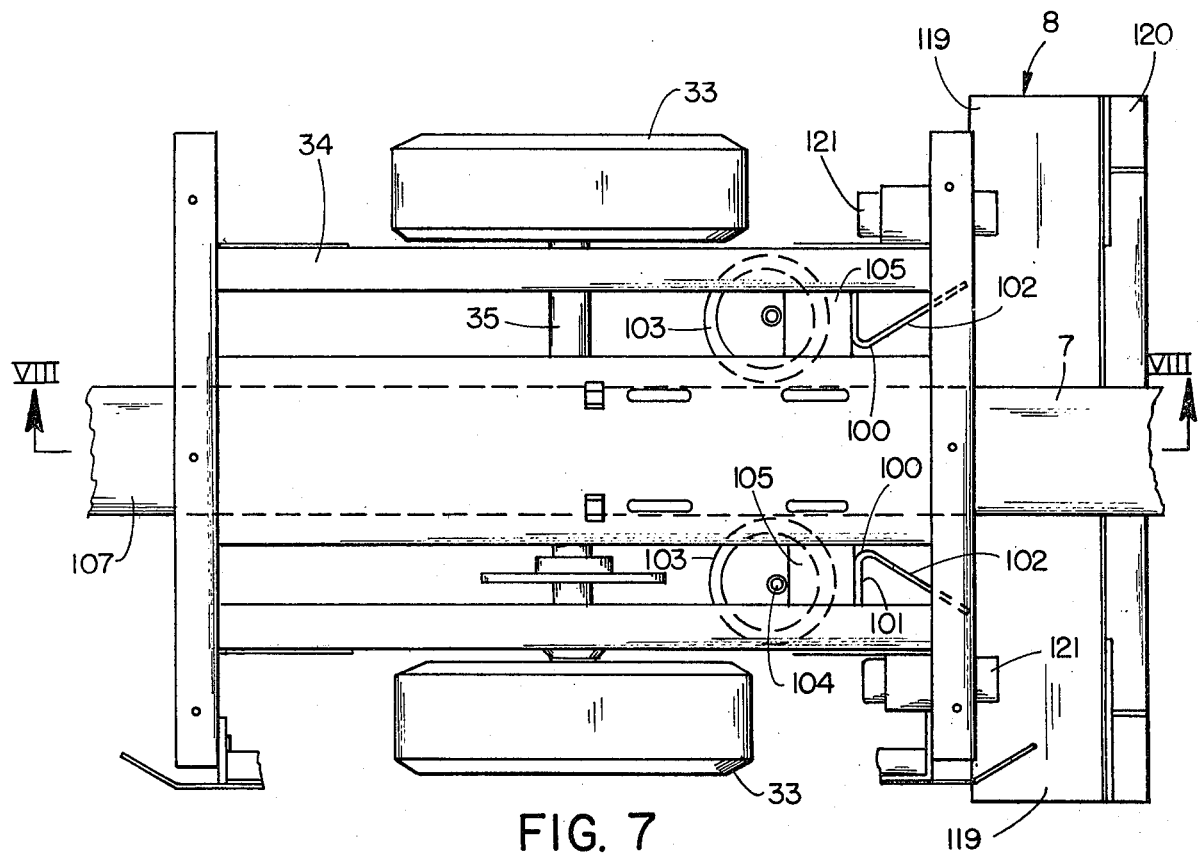
FIG. 7 is a fragmentary, top plan view of the conveyor, showing the guidance arrangement.

The guidance mechanism 5 is best illustrated in FIGS. 6-8, and includes a pair of inwardly inclined, wedge-shaped guides or bumpers 100, having one leg 101 fixedly attached to conveyor frame cross brace 105, and a free leg 102 which act as a semi-rigid guide, in the nature of a leaf spring in centering the upstream end of the conveyor over guide rail 7. The forward surfaces of bumper legs 102 are substantially flat, and disposed in a vertical plane, with the lower edge positioned below the upper surface of guide rail 7 for selective abutment therewith. The free ends of guide legs 102 are spaced apart a distance several times greater than the width of guide rail 7, so as to guide the conveyor onto rail 7 even when there is considerable misalignment. In this example, guides 100 create a "window" in the range of 14-18 inches wide. A pair of spaced apart caster wheels 103 are rotatably mounted on axles 104, which depend vertically from frame weldment 31. Wheels 103 are located at an elevation substantially commensurate with that of wedge shaped bumpers 100, below the top surface of guide rail 7. Wheels 103 are laterally aligned and spaced apart to engage opposite side surfaces of guide rail 7 for positively guiding conveyor 2 into a storage position. Guide wheels 103 are disposed outwardly of imaginary planes extending inwardly from bumper legs 102, so that bumpers 100 pre-center wheels 103 on either side of guide rail 7 before contact is made by the wheels. The illustrated wheels 103 are spaced apart approximately 6 inches, with a guide rail width of 5 inches.

Guide rail 7 comprises a straight, elongate section of rigid channel which is adapted for anchoring to the floor of the loading dock. The illustrated rail 7 (FIG. 6)

has an inverted U-shaped configuration, with a top wall 107, side walls 108 and bottom flanges 109, through which fasteners 110 extend into the floor. Preferably, guide rail 7 is constructed of a very durable material, such as structural steel. With reference to FIG. 1, the rearward or upstream end of guide rail 7 includes a pair of trapazoidal mounting plates 111 extending upwardly therefrom, which mount an electrical connection box 112 thereon. A safety post 113 is located adjacent to the electrical box 112 at the rearward end of guide rail 7 to protect the same from traffic. Guide rail 7 has a substantially uniform lateral cross sectional shape along its entire length, with a pointed or wedge-shaped forward end 114. Guide rail 7 preferably has a length which is less than the length of conveyor 2, and is positioned a spaced apart distance from the loading end of the dock. In this manner, the floor surface of the loading area which is disposed adjacent to the dock plate is completely smooth and unobstructed. The illustrated transport system has an overall conveyor length of 45 feet (approximately ten feet of gravity feed and 35 feet of powered belt), with a guide rail length of about 30 feet. The forward end 114 of guide rail 7 is spaced in the range of 20-25 feet from the outer edge of the dock plate, such that a fork lift truck can be easily manipulated in front of the guide rail.

The conveyor stop arrangement is best illustrated in FIGS. 7-8, and comprises ramp blocks 8 fixedly attached to opposite sides of guide rail 7 in a laterally aligned relationship. Ramp blocks 8 include a ramp 119 inclined downwardly in the downstream direction, and a vertical stop 120. A second pair of caster wheels 121 are mounted on conveyor frame 13 in a spaced apart fashion to straddle either side of guide rail 7, and rotate about a generally horizontal axis. Wheels 121 are positioned at an elevation slightly above the forwardmost or lowest edge of ramp 119, so that engagement between wheels 121 and surfaces 119 lifts drive wheels 33 off of the floor, thereby positively and safely stopping the conveyor at the storage position. Surfaces 119 of stop blocks 8 are sufficiently inclined that the weight of the conveyor will automatically cause the conveyor to slide downwardly from its elevated position to reengage drive wheels 33 with the floor of the loading area. Vertical stop members 120 provide a positive limit for conveyor translation, as discussed in greater detail below.

Figure 9:
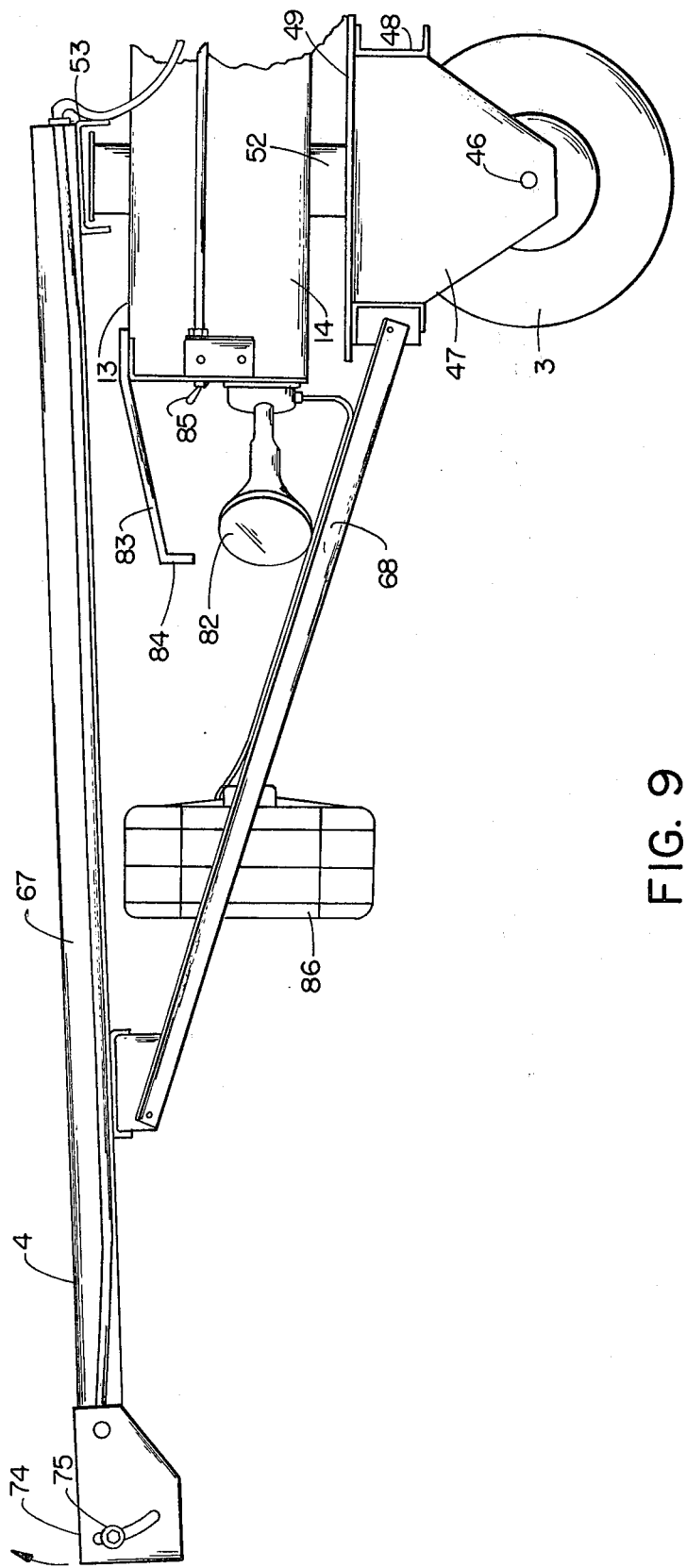
FIG. 9 is a fragmentary, side elevational view of the forward or downstream end of the conveyor.

In the example illustrated in FIG. 9, a pair of flood lights 82 are mounted on the forwardmost cross brace 15 of main frame 13, and are oriented angularly forward to reflect light into that area of the trailer which is being loaded. A guard 83 is mounted over flood lights 82, and includes a downwardly extending lip 84. Guard 83 protects the floodlights from any debris or foreign matter which may fall through the conveyor during use. A switch 85 is mounted at the downstream end of main frame 13, and controls the operation of flood lights 82. A fan 86 is mounted between angle supports 68, and is directed forwardly toward the free end of the conveyor to direct the flow of cool air into the work area. Preferably, fan 86 is attached to the conveyor in a manner so that it can be pivoted about a substantially horizontal axis to vary the direction of air flow. A toggle switch (not shown) similar to switch 85 is connected with fan 86, and is mounted on the front of main frame 13, adjacent light switch 85.

Electrical power is supplied to the drive assembly and conveyor belt motor of conveyor 2 from stationary service box 112 through a cable 125 (FIG. 1) carried on a reel 126. Reel 126 is rotatably mounted on the lower side of conveyor upstream end 20, and dispenses cable therefrom as the conveyor is moved outwardly from the storage position. A rotary electrical junction 127 is provided at the center of reel 126 to permit unlimited rotation with respect to frame 13. Since reel 126 moves with portable conveyor 2, cable 125 is gently laid down on and picked up from the floor, instead of being pulled behind the conveyor and causing abrasion.

With reference to FIGS. 11-13, transport 1 is adapted to be installed in a conventional loading dock 130, of the type having a plurality of bays 131 disposed closely together in a side-by-side relationship. Each bay 131 is sufficiently long to receive a portable conveyor 2 therein in a longitudinally aligned fashion, and includes a conventional dock plate 132 which can be adjusted to form a suitable ramp or bridge between the loading dock 130 and a semitrailer 133 or other similar cargo vehicle. Portable conveyor 2 is preferably positioned along one side of the bay 131, so as to leave sufficient room to permit a palletized cargo transport, such as fork lift 134 (FIGS. 12-13) to drive alongside conveyor 2. In this fashion, semitrailer 133 can be simultaneously loaded with non-palletized articles from conveyor 2, as well as palletized articles from fork lift 134. Because conveyor 2 is steerable, it can be accurately and safely positioned along one side of the semitrailer 133 without requiring a difficult or time consuming manipulation. This off-center positioning of conveyor 2 is achieved by anchoring guide rail 7 to the floor of loading dock 130 in a longitudinal parallel relationship, and off-set laterally from the longitudinal center line a predetermined distance so that when assembled with a conveyor, one side of the conveyor is aligned with an associated side of a semitrailer 133 parked in an aligned and centered position in the bay area. For example, with an average semitrailer width of eight feet, two 40×48 inch pallets can be placed side-by-side in the trailer. With main frame 13 having a width of 30 inches, guide rail 7 is preferably off-set approximately two feet from the center-line of the bay 131, thereby forming an aisle 135 for fork lifts and hand trucks.

To load semitrailer 133, the operator assumes a position in front of conveyor 2, grasps handle 91, and depresses both switches 92, so that conveyor 2 moves forwardly toward the interior of semitrailer 133. Conveyor 2 is driven over dock plate 132 directly into the semitrailer 133 until the forwardmost end of conveyor 2 is located adjacent to the front end of trailer 133. The operator may then pivot gravity feed conveyor portion 67 to one side, in the manner illustrated in FIG. 12 to facilitate loading both sides of semitrailer 133. Belt conveyor 22 is then activated by depressing switch 94, and non-palletized articles, supplied by an overhead warehouse conveyor (not shown), or other similar means, are transported to the downstream end of conveyor 2 and are manually removed therefrom and preferably stacked onto pallets. Fork lift truck 134 can simultaneously load palletized goods into the opposite side of trailer 133. Since the downstream end of conveyor 2 is supported on wheels 3, the height of the off-load area of the conveyor with respect to the floor of the semitrailer remains at a convenient height to lift off the articles. This off-load height remains constant, even though the height of the semitrailers and truck beds varies.

As the trailer is filled from front to rear, the operator swings the pivoting gravity feed section 67 into an aligned position with the conveyor if it has been angled, and sequentially moves the conveyor back toward the loading dock. Since guide rail 7 is shorter than conveyor 2, the conveyor becomes bodily detached from the guidance mechanism when the conveyor is extended. When conveyor 2 is returned to the storage position, the drive wheel end of conveyor 2 approaches the pointed, forward end 114 of guide rail 7. The depending guides 6 on conveyor 2 engage guide rail 7, and caster with wheels 103, positively guide the upstream end of the conveyor back into the storage position. Ramp blocks 8 prevent conveyor 2 from overshooting the storage position. Caster wheels 121 engage the inclined ramps 119 of blocks 8 as conveyor 2 reaches the storage position, such that continued rearward translation of the conveyor causes the conveyor drive wheels 33 to be lifted off of the floor and thereby safely and smoothly stop the conveyor in the storage position, without requiring tediously careful manipulation of control switches 93. If the conveyor has gained substantial momentum which carries the conveyor rearwardly even after the drive wheels have been lifted off of the ground, caster wheels 121 will engage upstanding blocks 120 to positively halt conveyor translation in the rearward direction.

As best illustrated in FIG. 13, in the event that the operator wishes to angle the conveyor in the bay so as to permit fork lift access to both sides of the trailer, he simply pivots the gravity feed conveyor section 67 so as to pilot the downstream end of conveyor 2 into the position indicated by the full lines in FIG. 13. The upstream end of conveyor 2 is held in place by guidance mechanism 5. To return conveyor 2 to the storage position shown in FIG. 11, the operator simply moves the conveyor out towards semitrailer 133, while manipulating arm 67 to steer the conveyor back into alignment with guide rail 7. Conveyor 2 is then stopped and moved in the opposite direction, toward safety post 113, while simultaneously completing the steering motion to align the conveyor over guide rail 7.

In the embodiment illustrated in FIGS. 11-13, the length of guide rail 7 is selected in accordance with the length of bay 130, so that conveyor 2 cannot detach from guide rail 7 unless the conveyor is driven into a staged trailer 133. This provides additional safety for the conventional loading dock arrangement. However, it is to be understood that for special applications, the length of guide rail 7 could be adjustable, or otherwise made shorter, so that the conveyor could be driven off of the guidance mechanism to any desired area, such as for maintenance or replacement. For these special applications, additional power outlets would be required at appropriate locations throughout the loading dock area. This would permit conveyor 2 to be used to service a similarly equipped bay, with the same type of power post and guide rail 7. For instance, in the case of an emergency replacement, conveyor 2 could simply be driven off of the guide rail 7 in bay 130, piloted onto the guide rail of the other bay, and the power cord reconnected with the associated power outlet.

The transport system 1 provides a very efficient mechanism for quickly loading semitrailers and other similar cargo vehicles. The guidance mechanism 5 locates self-propelled conveyor 2 along one side of the bay area, so that there is sufficient room on the other side of the conveyor to permit a fork lift truck to simultaneous load palletized goods into the semitrailer, thereby reducing load time and cost. The conveyor 2 is steerable so that it can be accurately and easily placed in a position within the semitrailer along one side thereof, and can also be bodily transported out of the dock plate area so that fork lift trucks can access either side of the trailer. The guidance system 5 is quite durable, and does not present any floor obstructions near the loading end of the bay. The pivoting gravity feed section at the end of the conveyor not only provides a steering arm, but also permits lateral adjustment of the take-off area for ease of unloading. The conveyor stops safely and positively halts motion of the conveyor when it has reached the storage position.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A transport for loading semitrailers and the like, comprising:
an elongate conveyor having means for conveying articles from an upstream end to a downstream end of said conveyor;
means for movably supporting said conveyor on the floor surface of a loading area;
means for guiding said portable conveyor into a selected storage position in the loading area, and comprising:
a pair of guides connected with the upstream end of said conveyor, and depending therefrom to a position adjacent to the floor surface;
a guide rail adapted for anchoring onto the loading area floor surface at a position corresponding to the selected conveyor storage position; said guide rail upstanding from the floor surface, and having a width which is matingly received between said guides for positively guiding the upstream end of said conveyor into the selected storage position; said guide rail being shorter than said conveyor, whereby said conveyor is bodily detachable from said guide rail for readily transporting said conveyor to various locations.

2. A transport as set forth in claim 1, including:
power means for self-propelling said conveyor.

3. A transport as set forth in claim 2, including:
means for steering the downstream end of said conveyor between said storage position and various trailer loading positions.

4. A transport as set forth in claim 3, wherein:
said steering means includes at least one ground engaging wheel pivotally mounted at the downstream end of said conveyor, being a portion of said conveyor support means, and having means for rotating said wheel in a generally horizontal plane.

5. A transport as set forth in claim 4, wherein:
said wheel rotating means comprises a steering arm connected with and projecting in a downstream direction from said wheel for manually steering said conveyor.

6. A transport as set forth in claim 5, wherein:
said guide rail is adapted to be positioned in the loading area in a longitudinally aligned relationship with the semitrailer; and
said conveyor is generally aligned with said guide rail in the storage position.

7. A transport as set forth in claim 6, including:

means for remotely controlling said power means from the free end of said steering arm.

8. A transport as set forth in claim 7, wherein:
said power means includes a pair of drive wheels; and including
a conveyor stop comprising:
  a first stop attached to said conveyor at a location adjacent to said drive wheels, and including an abutment surface;
  a second stop having means for anchoring the same stationary on the floor surface of the loading area, and including an abutment surface, which is shaped to mate with said first stop abutment surface and is disposed at a substantially commensurate elevation therewith; at least one of said abutment surfaces being inclined downwardly at a trailing edge and upwardly at a leading edge, whereby engagement between said abutment surfaces as said conveyor is piloted into the storage position lifts said drive wheels off of the floor, thereby positively and safely stopping said conveyor in the storage position.

9. A transport as set forth in claim 8, wherein:
said one abutment surface is sufficiently inclined that the weight of said conveyor will automatically cause the conveyor to slide downwardly from the elevated position to reengage the drive wheels with the floor surface of the loading area.

10. A transport as set forth in claim 9, wherein:
said guide rail comprises an inverted U-shaped channel having flanges attached to the floor surface by fasteners.

11. A transport as set forth in claim 10, wherein:
said guides include a pair of inwardly inclined, wedge-shaped members for piloting said conveyor onto the forward end of said guide rail.

12. A transport as set forth in claim 11, wherein:
said guides further comprise a pair of laterally spaced apart wheels located rearwardly of said wedge-shaped members and oriented in a horizontal plane to engaged opposite side surfaces of said guide rail.

13. A transport as set forth in claim 12, wherein:
said guide rail forward end is pointed to facilitate aligning said conveyor upstream end onto said guide rail.

14. A transport as set forth in claim 13, wherein:
said conveying means is two-part, and comprises a gravity feed section having one end pivotally connected with the downstreammost portion of said conveyor, and extending in a generally downstream direction therefrom, whereby said gravity feed section can be angled with respect to the remainder of said conveyor to facilitate unloading said conveying means.

15. A transport as set forth in claim 14, wherein:
said gravity feed section one end is attached to and pivots with said steerable wheel to provide said steering arm.

16. A transport as set forth in claim 15, wherein:
said conveyor supporting means further comprises a second steerable wheel mounted laterally adjacent and pivoting with said first named steering wheel in a side-by-side relationship.

17. A transport as set forth in claim 1, including:
means for steering the downstream end of said conveyor between said storage position and various trailer loading positions.

18. A transport as set forth in claim 17, wherein:
said steering means includes at least one ground engaging wheel pivotally mounted at the downstream end of said conveyor, being a portion of said conveyor support means and having means for rotating said wheel in a generally horizontal plane for steering said conveyor as it traverses over the floor surface of the loading area.

19. A transport as set forth in claim 18, including:
a steering arm connected with and projecting from said wheel for manually steering said conveyor.

20. A transport as set forth in claim 2, wherein:
said power means includes a pair of drive wheels; and including
a conveyor stop comprising:
  a first stop attached to said conveyor at a location adjacent to said drive wheels, and including an abutment surface;
  a second stop having means for anchoring the same stationary on the floor surface of the loading area, and including an abutment surface, which is shaped to mate with said first stop abutment surface and is disposed at a substantially commensurate elevation therewith; at least one of said abutment surfaces being inclined downwardly at a trailing edge and upwardly at a leading edge, whereby engagement between said abutment surfaces as said conveyor is piloted into the storage position lifts said drive wheels off of the floor surface, thereby positively and safely stopping said conveyor in the storage position.

21. A transport as set forth in claim 1, wherein:
said guide rail comprises an inverted U-shaped channel having flanges attached to the floor by fasteners.

22. A transport as set forth in claim 1, wherein:
said guides include a pair of inwardly inclined, wedge-shaped members for piloting the upstream end of said conveyor onto the forward end of said guide rail.

23. A transport as set forth in claim 22, wherein:
said guides further comprise a pair of spaced apart wheels located rearwardly of said wedge-shaped members and are adapted to engage opposite side surfaces of said guide rail.

24. A transport system for loading semitrailers and the like, comprising:
an elevated loading dock;
an elongate conveyor having means for conveying articles from an upstream end to a downstream end of said conveyor;
means for movably supporting said conveyor on the floor surface of said loading dock;
means for guiding said portable conveyor into a selected storage position in said loading dock, and comprising:
  a pair of guides connected with the upstream end of said conveyor, and depending therefrom to a position adjacent to the floor surface;
  a guide rail anchored to the loading area floor surface at a position corresponding to the selected conveyor storage position; said guide rail upstanding from the floor surface, and having a width which is matingly received between said guides for positively guiding the upstream end of said conveyor into the selected storage position; said guide rail being located along one side of said loading dock, whereby fork lift trucks and the like can pass alongside said conveyor.

25. A transport system as set forth in claim 24, wherein:

said loading dock includes a ramp shaped to bridge said dock with the rear end of a semi-trailer; and said conveyor is self-propelled, and includes a ground engaging wheel pivotally mounted at the downstream end of said conveyor for steering said conveyor into the semitrailer for loading non-palletized articles, and steering the downstream end of said conveyor off of said ramp to one side of said loading dock, to fully access the semitrailer for truck loading palletized articles.

26. A transport system as set forth in claim 25, wherein:

said guide rail extends to a location spaced apart from said ramp, such that the floor surface of the loading area in front of said ramp is unobstructed by said transport system.

27. A transport system as set forth in claim 26, wherein:

said guide rail is shorter than said conveyor, whereby said conveyor is bodily detachable from said guide rail and can be piloted to any location in said loading area.

28. In a conveyor system for loading semitrailers and the like, having a self-propelled conveyor with drive wheels which transport the conveyor over the floor of a loading area between a preselected storage position, and various loading positions, the improvement of a conveyor stop comprising:

a guide attached to said conveyor at a location adjacent to said drive wheels, and including an abutment surface;

a stop block having means for anchoring the same stationary on the floor of the loading area, and having an abutment surface shaped to mate with said guide abutment surface, and disposed at a substantially commensurate elevation therewith; at least one of said abutment surfaces being inclined downwardly at a trailing edge and upwardly at a leading edge, whereby engagement between said abutment surfaces as said conveyor is piloted into the storage position lifts said drive wheels off of the floor, thereby positively and safely stopping said conveyor in the storage position.

29. A conveyor system as set forth in claim 28, wherein:

said one abutment surface is sufficiently inclined that the weight of said conveyor will automatically cause the conveyor to slide downwardly from the elevated position to reengage the drive wheels with the floor surface of the loading area.

30. A conveyor system as set forth in claim 29, wherein:

said one abutment surface is disposed on said stop block; and said guide comprises a wheel having a peripheral surface defining said other abutment surface.

31. A transport system for loading semitrailers and the like, comprising:

an elevated loading dock;

an elongate conveyor having means for conveying articles from an upstream end to a downstream end of said conveyor;

means for movably supporting said conveyor on the floor surface of said loading dock;

means for guiding said portable conveyor into a selected storage position in said loading dock, and comprising:

a pair of guides connected with the upstream end of said conveyor, and depending therefrom to a position adjacent to the floor surface;

a guide rail anchored to the loading area floor surface at a position corresponding to the selected conveyor storage position; said guide rail upstanding from the floor surface, and having a width which is matingly received between said guides for positively guiding the upstream end of said conveyor into the selected storage position; said guide rail being located along one side of said loading dock, whereby fork lift trucks and the like can pass alongside said conveyor.

* * * * *